United States Patent
Yoshida et al.

(10) Patent No.: US 9,172,292 B2
(45) Date of Patent: Oct. 27, 2015

(54) HYBRID STEPPING MOTOR

(71) Applicant: MINEBEA CO., LTD., Kitasaku-Gun, Nagano (JP)

(72) Inventors: Naohiro Yoshida, Iwata (JP); Takeshi Sato, Toumi (JP); Takatoshi Kuwano, Kakegawa (JP)

(73) Assignee: Minebea Co., Ltd., Nagano (JP)

( * ) Notice: Subject to any disclaimer, the term of this patent is extended or adjusted under 35 U.S.C. 154(b) by 308 days.

(21) Appl. No.: 13/795,041

(22) Filed: Mar. 12, 2013

(65) Prior Publication Data

US 2013/0249331 A1 Sep. 26, 2013

(30) Foreign Application Priority Data

Mar. 23, 2012 (JP) ................. 2012-068220

(51) Int. Cl.
*H02K 37/18* (2006.01)
*H02K 37/14* (2006.01)

(52) U.S. Cl.
CPC ............... *H02K 37/14* (2013.01); *H02K 37/18* (2013.01)

(58) Field of Classification Search
None
See application file for complete search history.

(56) References Cited

U.S. PATENT DOCUMENTS

| | | | |
|---|---|---|---|
| 3,564,312 A * | 2/1971 | Bunea | 310/168 |
| 5,283,486 A | 2/1994 | Kobori | |
| 6,057,613 A | 5/2000 | Trago | |
| 6,160,330 A * | 12/2000 | Sakamoto | 310/216.097 |
| 6,731,027 B2 * | 5/2004 | Ohnishi et al. | 310/49.41 |
| 2007/0273241 A1 | 11/2007 | Niguchi et al. | |

FOREIGN PATENT DOCUMENTS

| | | |
|---|---|---|
| JP | 5-168214 A | 7/1993 |
| JP | 2002-503078 A | 1/2002 |
| JP | 2007-318974 A | 12/2007 |

* cited by examiner

*Primary Examiner* — Tran Nguyen

(74) *Attorney, Agent, or Firm* — Carrier Blackman & Associates, P.C.; Joseph P. Carrier; Anne G. Sabourin

(57) ABSTRACT

There is provided a hybrid stepping motor including a rotor including a plurality of rotor small teeth arranged on an outer circumferential surface thereof, and a stator including a plurality of salient poles, each including a plurality of stator small teeth. The stator small teeth have a predetermined stator tooth thickness and are arranged at a predetermined stator tooth pitch, the rotor small teeth have a predetermined rotor tooth thickness and are arranged at a predetermined rotor tooth pitch, and a facing area which is a difference between an area of attraction poles of the stator small teeth and the rotor small teeth and an area of repulsion poles thereof ranges between a maximum value in a parameter space of a dimensional ratio of the stator and/or the rotor and a threshold value of the maximum value.

4 Claims, 8 Drawing Sheets

ATTRACTION POLE AND REPULSION POLE OF STEPPING MOTOR

CONFIGURATION OF STATOR OF THE PRESENT EMBODIMENT

CONFIGURATION OF HYBRID STEPPING MOTOR
ACCORDING THE PRESENT EMBODIMENT

ATTRACTION POLE AND REPULSION POLE OF STEPPING MOTOR

CONFIGURATION OF STATOR OF THE PRESENT EMBODIMENT

CONFIGURATION OF ROTOR OF THE PRESENT EMBODIMENT

RELATION BETWEEN STATOR TOOTH THICKNESS/STATOR INNER DIAMETER
AND RESPECTIVE CHARACTERISTIC ACCORDING TO THE PRESENT EMBODIMENT

RELATION BETWEEN STATOR TOOTH THICKNESS/STATOR TOOTH PITCH
AND RESPECTIVE CHARACTERISTICS ACCORDING TO THE PRESENT EMBODIMENT

*FIG. 6B*  FACING AREA RATIO

RELATION BETWEEN ROTOR TOOTH THICKNESS/ROTOR OUTER DIAMETER
AND RESPECTIVE CHARACTERISTICS ACCORDING TO THE PRESENT EMBODIMENT

RELATION BETWEEN ROTOR TOOTH THICKNESS/ROTOR TOOTH PITCH
AND RESPECTIVE CHARACTERISTICS ACCORDING TO THE PRESENT EMBODIMENT

HYBRID STEPPING MOTOR

CROSS-REFERENCE TO RELATED APPLICATION

This application claims priority from Japanese Patent Application No. 2012-068220, filed on Mar. 23, 2012, the entire subject matter of which is incorporated herein by reference.

BACKGROUND OF THE INVENTION

1. Field of the Invention

The present invention relates to a hybrid stepping motor using a permanent magnet for a rotor.

2. Description of the Related Art

Recently, downsizing and power saving of motors have been highly demanded. In motors having the same external size, if a greater torque can be obtained, an electric current supplied to the motors can be reduced, thereby realizing power saving.

The technical history of stepping motors will be described while taking a 1.8 degrees step (200 steps) hybrid stepping motor as an example.

In early 1.8 degrees (200 step) hybrid stepping motor, both of a stator tooth pitch and a rotor tooth pitch are 7.2 degrees. However, in recent hybrid stepping motors, the stator tooth pitch and the rotor tooth pitch are different from each other to reduce vibrations and noises. Specifically, in a recent hybrid stepping motor, the rotor tooth pitch remains 7.2 degrees, but the stator toot pitch is usually 6.6 to 7.0 degrees.

A typical stator has six small teeth in one pole (salient pole). If the stator tooth pitch and the rotor tooth pitch are different from each other, positional relations of between six stator small teeth and rotor small teeth are also different from each other. Therefore, in the recent hybrid stepping motor, a facing area of attraction poles (N pole and S pole) would be decreased, whereas a facing area of repulsion poles (N pole and N pole, S pole and S pole) would be increased compared to the early stepping motor, and therefore, a torque would be reduced. Herein, the facing area of attraction poles (N pole and S pole) and the facing area of repulsion poles (N pole and N pole, S pole and S pole) refer to those areas when the motor is in a stopped state after excitation.

In order to increase a torque, the following related-art technique can be used.

JP-A-2002-503078 discloses a hybrid stepping motor where torque per unit volume, i.e., "torque density" is optimized. According to JP-A-2002-503078, the torque density is maximized at an id/od ratio of 0.61. Also, a tooth thickness/a tooth pitch is preferably 0.38 to 0.45, and particularly 0.42.

JP-A-H5-168214 discloses a hybrid stepping motor where a ratio of an inner diameter of a stator to an outer diameter thereof is 0.62 to 0.64 in a case of two-phases and 0.605 to 0.625 in a case of five-phases in order to generate a maximum torque in a rotor. Also, it is described that the ratio of the inner diameter of the stator to the outer diameter is around 0.53 in the conventional stepping motor.

JP-A-2007-318974 discloses a brushless motor where a tooth width of a stator core is 0.14 or more times of an outer diameter of a rotor.

Regarding a torque of stepping motors, static characteristics and dynamic characteristics have factors contrary to each other, and therefore, their parameter cannot be defined in one way. However, any of the above-described motors cannot increase pull-out torque satisfactorily.

SUMMARY OF THE INVENTION

Accordingly, an aspect of the present invention is to provide a stepping motor which can obtain an increased torque while suppressing vibrations and noises, without changing outer diameter dimensions.

According to an illustrative embodiment of the present invention, there is provided a hybrid stepping motor comprising: a rotor including a plurality of rotor small teeth arranged at an equal pitch on an outer circumferential surface thereof; and a stator including a plurality of salient poles, each including a plurality of stator small teeth arranged to face the outer circumferential surface of the rotor via a gap, wherein the stator small teeth have a predetermined stator tooth thickness and are arranged at a predetermined stator tooth pitch, the rotor small teeth have a predetermined rotor tooth thickness and are arranged at a predetermined rotor tooth pitch, and a facing area which is a difference between an area of attraction poles of the stator small teeth and the rotor small teeth and an area of repulsion poles thereof ranges between a maximum value in a parameter space of a dimensional ratio of the stator and/or the rotor and a threshold value of the maximum value.

Other illustrative embodiments will be described in the following detailed description.

According to the above configuration, a stepping motor can be provided which can obtain an increased torque while suppressing vibrations and noises, without changing outer diameter dimensions.

BRIEF DESCRIPTION OF THE DRAWINGS

In the accompanying drawings:

FIGS. 6A and 6B are graphs showing relations between the stator tooth thickness/a stator tooth pitch and respective characteristics according to the illustrative embodiment;

DETAILED DESCRIPTION

Illustrative embodiments of the present invention will be now described in detail with reference to the accompanying drawings.

Configuration of Present Illustrative Embodiment

Figure 1:
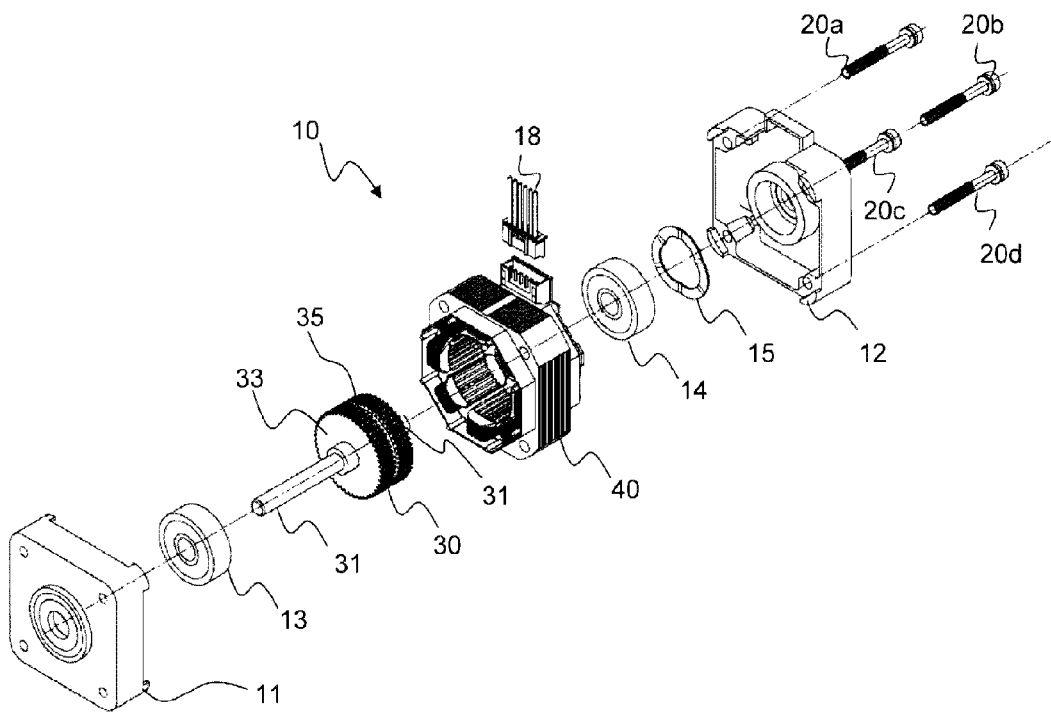
FIG. 1 is a configuration view showing a hybrid stepping motor according to an illustrative embodiment of the present invention.

FIG. 1 is a configuration view showing a hybrid stepping motor according to an illustrative embodiment of the present invention.

According to the present illustrative embodiment, a stepping motor 10 includes a front flange 11, a ball bearing 13, a rotor 30, a stator 40, a lead wire connector 18, a ball bearing 14, a spring shim 15, a rear flange 12, and bolts 20a to 20d.

A front portion of a rotational axis 31 of the rotor 30 is inserted into a bearing of the front flange 11 via the ball bearing 13. A rear portion of the rotational axis 31 of the rotor 30 is inserted into a bearing of the rear flange 12 via the ball bearing 14 and is urged by the spring shim 15 toward the front side thereof.

The rear flange 12 is fixed to the rotor 40 and the front flange 11 by the four bolts 20a to 20d. The stator 40 is fixed to be disposed adjacent to an outer circumferential portion of the rotor 30. A relation of the stator 40 and the rotor 30 is described in FIG. 2.

As shown in FIG. 1, the front flange 11 and the rear flange 12 configure an outer housing of the stepping motor 10. The front flange 11 and the rear flange 12 are configured to allow rotation of the rotor 30 by bearings in the center portion thereof. The front flange 11 and the rear flange 12 are fixed to each other by the bolts 20a to 20d with the stator 40 interposed therebetween. Hereinafter, unless mentioned particularly, bolts 20a to 20d will be simply referred to as a bolt 20.

The ball bearing 13 and 14 are configured to reduce rotation friction of the rotor 30.

The spring shim 15 is mounted between the ball bearing 14 and the rear flange 12 to urge the ball bearing 14 toward the front side thereof, thereby positioning the rotor 30 in a front-rear direction.

The rotor 30 includes rotor cores 33, the rotational axis 31 disposed in the center of the rotor cores 33, and a magnet (permanent magnet) 35. Two rotor cores 33 are arranged with the magnet 35 interposed therebetween, so that one of the rotor cores generates an N-pole magnetic field and the other generates an S-pole magnetic field toward an outer circumferential side thereof.

The stator 40 generates a predetermined magnetic field by a driving electric power.

The lead wire connector 18 is fixed on an upper side of the rotor 40. The lead wire connector 18 is a connector for supplying an electric power for driving the stepping motor 10 to coils 44.

Figure 2A:
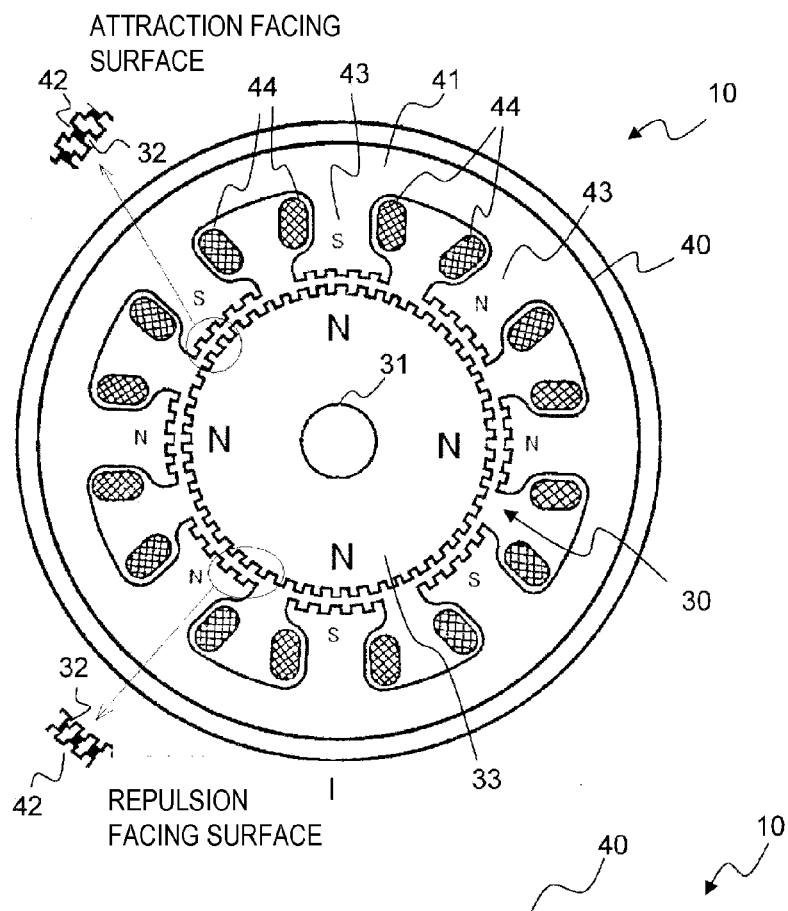
FIGS. 2A and 2B are explanatory views showing an attraction pole and a repulsion pole of a typical stepping motor.
Figure 2B:
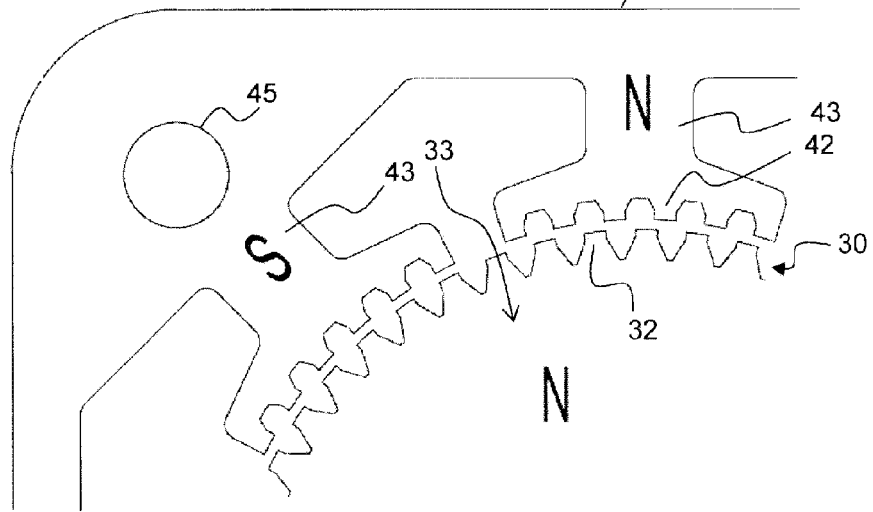

FIGS. 2A and 2B are explanatory views showing an attraction pole and a repulsion pole of a typical stepping motor.

FIG. 2A shows a relation between the rotor 30 and the stator 40 of a typical stepping motor.

The stator 40 has a stator yoke 41. Eight stator poles 43 are formed at an equal interval on an inner circumferential side of the stator yoke 41. Each of the stator poles 43 has six stator small teeth 42 on an inner side. The coils 44 are respectively wound on each of the stator poles 43. That is, the stator 40 has a plurality of stator poles 43 formed as a plurality of salient poles, respectively. The stator poles 43 are arranged to face an outer circumferential surface of the rotor 30 via a gap.

The rotor 30 has a generally cylindrical shape and is provided with the rotational axis 31 at the center portion thereof. On an outer circumferential side of the rotor cores 33, a plurality of rotor small teeth 32 are provided at an equal interval (equal pitch). Two rotor cores 33 are arranged with the magnet 35 interposed therebetween, so that one of the rotor cores generates an N-pole magnetic field and the other generates an S-pole magnetic field toward the outer circumferential side thereof. For convenience of explanation, only the rotor core which generates the N-pole magnetic field is shown in FIG. 2A.

In FIG. 2A, the stator 40 generates a predetermined magnetic field by flowing a predetermined electric current to each of a A-phase coil and a B-phase coil via the lead wire connector 18. In FIG. 2A, two same polarity magnetic fields are alternately generated in the manner as S-pole, S-pole, N-pole, N-pole, S-pole, S-pole, N-pole, and N-pole, in the order of adjacent stator poles 43.

In the stator poles 43 which generate the S-pole magnetic field, the stator small teeth 42 and the rotor small teeth 32 form attraction facing surfaces (i.e., attraction pole surfaces). In the stator poles 43 which generate the N-pole magnetic field, the stator small teeth 42 and the rotor small teeth 32 form repulsion facing surfaces (i.e., repulsion pole surfaces).

FIG. 2B is an enlarged view of the rotor 30 and the stator 40 of the typical stepping motor.

A hole 45 is formed in a left upper corner of the stator yoke 41. The stator 40 is fixed to the housing via the hole 45.

The stator pole 43 provided on an upper side of FIG. 2B generates the N-pole magnetic field, and thus, for the stator pole 43, the stator small teeth 42 and the rotor small teeth 32 form repulsion facing surfaces (i.e., repulsion pole surfaces).

The stator pole 43 provided diagonally on a left upper side of FIG. 2B generates the S-pole magnetic field, and thus, for the stator pole 43, the stator small teeth 42 and the rotor small teeth 32 form attraction facing surfaces (i.e., attraction pole surfaces). Herein, a "difference" obtained by subtracting the total area of repulsion pole surfaces from the total area of attraction pole surfaces is referred as to a "facing area (also referred to as an effective facing area)".

Figure 3A:
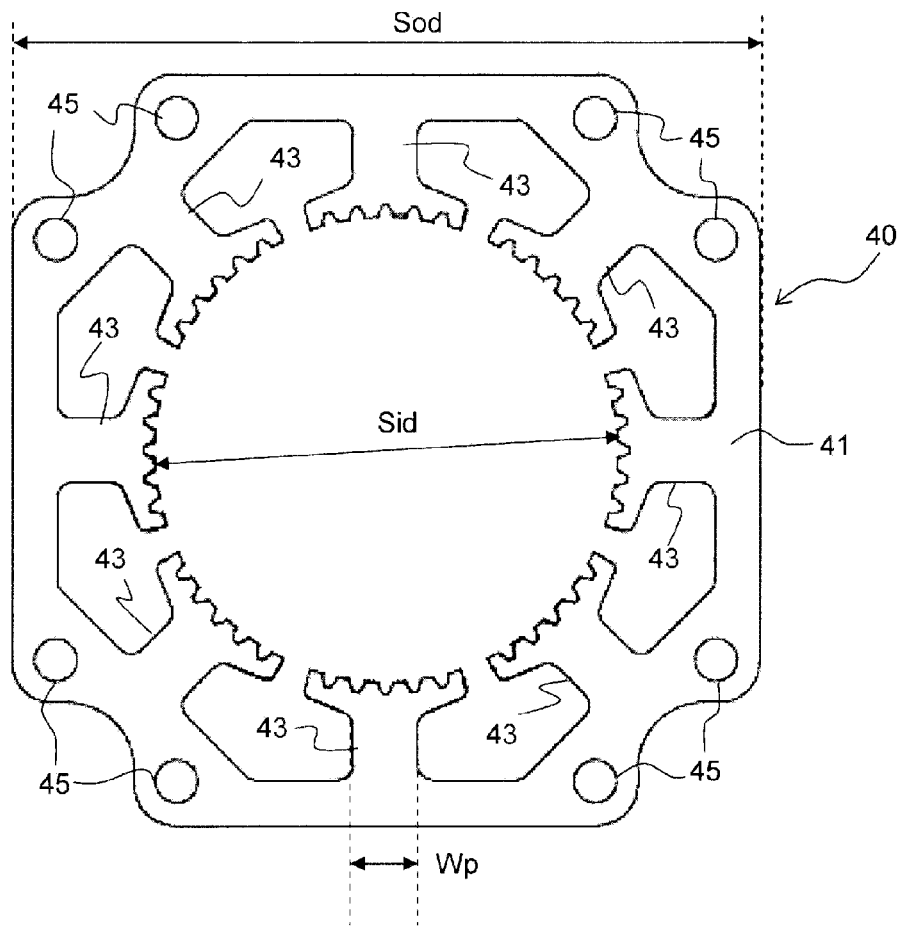
FIGS. 3A and 3B are schematic configuration views showing a stator according to the illustrative embodiment.
Figure 3B:
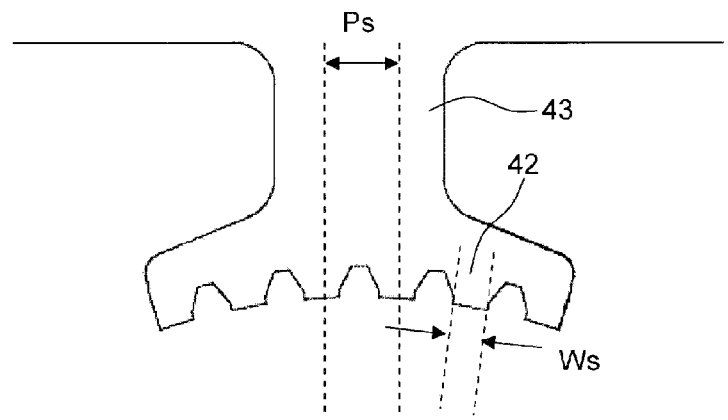

FIGS. 3A and 3B are schematic configuration views showing the stator according to the present illustrative embodiment.

FIG. 3A shows the entire of the stator 40 according to the illustrative embodiment.

The stator 40 of the stepping motor 10 according to the illustrative embodiment is an approximately square prism shaped core, each of four corners thereof is provided with the hole 45, and thus, each corner is formed along the hole 45.

The hole 45 is a hole properly designed to insert the bolt 20 therein. The stator 40 is formed by laminating silicon steel plates press-worked to have the shape as described above.

On the inner side of the stator yoke 41, eight stator poles 43 are provided at an equal interval in a radial manner. The stator yoke 41 is formed by laminating the predetermined number of plates, and the A-phase coil (not shown) and the B-phase coil (not shown) are wound on each of the stator poles 43, so that 2-phases hybrid stepping motor can be obtained. The rotor 30 is disposed to face the stator small teeth 42 of the stator pole 43 via a gap.

An outer diameter of the stator yoke 41 (herein, although an outer shape of the stator is not a circle but a square, a length of one side is referred to as the outer diameter) is designated as a stator outer diameter Sod. The Sod as described in the present illustrative embodiment is 56.4 mm. An inner circumferential diameter of the stator 40 is designated as a stator inner diameter Sid.

FIG. 3B is an enlarged view showing a portion of the stator pole 43.

On a distal end of each of the stator poles 43, six stator small teeth 42 are formed at an equal pitch. A tooth bottom shape of the stator small teeth 42 is a reversed trapezoid. The rotor small teeth 42 have a uniform thickness from a distal end thereof to a predetermined portion and then are inclined at a predetermined angle from the predetermined portion to the tooth bottom to have a greater thickness toward the tooth bottom. A thickness of the stator small teeth 42 is designated as a stator tooth thickness Ws. A distance between the stator small teeth 42 is designated as a stator tooth pitch Ps. In the present illustrative embodiment, the stator tooth pitch Ps is a circular arc of 6.9 degrees.

Figure 4A:
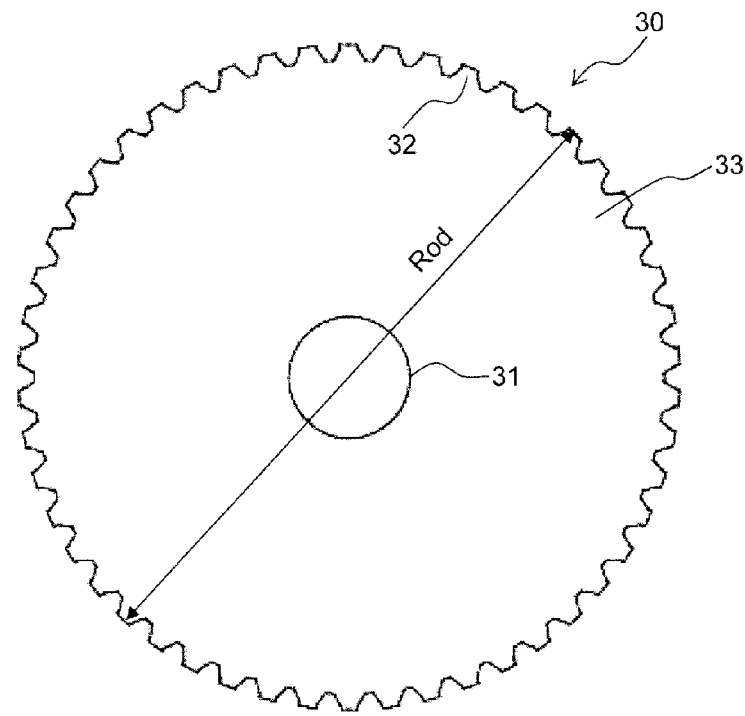
FIGS. 4A and 4B are schematic configuration views showing a rotor according to the illustrative embodiment.
Figure 4B:
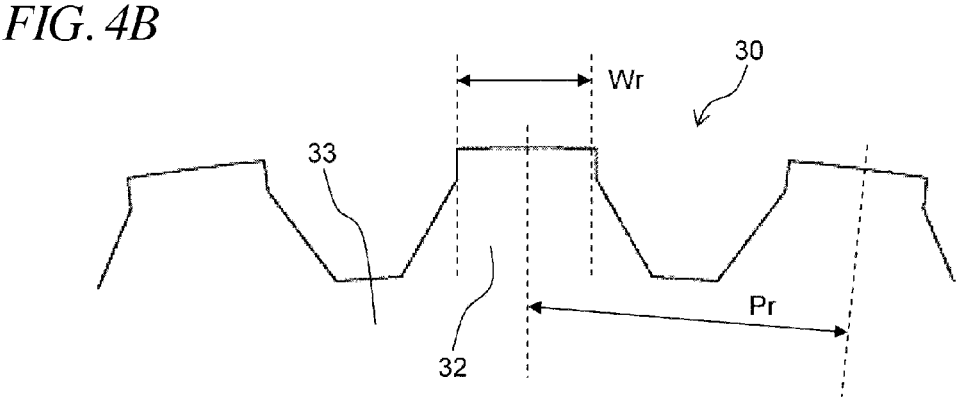

FIGS. 4A and 4B are schematic configuration views showing the rotor according to the present illustrative embodiment.

FIG. 4A is a view showing the entire of the rotor 30.

The rotor 30 includes the rotational axis 31, the magnet 35 (not shown) and the rotor cores 33 mounted on the rotational axis 31. The rotor cores 33 are formed by laminating a predetermined number of plates and are disposed on both sides of the magnet 35 having N and S poles magnetized in an axial direction with the magnet 35 sandwiched therebetween. A plurality of rotor small teeth 32 are provided at an equal pitch on the outer circumference of the rotor cores 33. A rotor outer diameter Rod is a diameter of the rotor cores 33 and is changed to be 1.06 times greater than that of an existing structure.

FIG. 4B is an enlarged view showing the outer circumference of the rotor 30.

The rotor small teeth 32 are formed at an equal pitch on the outer circumference of the rotor cores 33. A tooth bottom shape of the rotor small teeth 32 is a reversed trapezoid. The rotor small teeth 32 have a uniform thickness from a distal end thereof to a predetermined portion and then are inclined at a predetermined angle from the predetermined portion to the tooth bottom to have a greater thickness toward the tooth bottom. Therefore, the rotor small teeth 32 can improve a structural strength thereof to prevent strain and thus fracture thereof, even if an attraction or repulsion force is exerted in a transverse direction.

A thickness of the rotor small teeth 32 is designated as a rotor tooth thickness Wr. A distance between the rotor small teeth 32 is designated as a rotor tooth pitch Pr. In the illustrative embodiment, the rotor tooth pitch Pr is a circular arc of 7.2 degrees.

Dimensions of the Present Illustrative Embodiment

The hybrid stepping motor 10 according to the illustrative embodiment has a structure intended to increase a torque at a low speed without significantly reducing a torque at a high speed compared to an existing structure. As used herein, the term "low speed" means that the stepping motor 10 is driven by a two-phase excitation pulse from 0 to 1500 Hz. The term "high speed" means that the stepping motor 10 is driven by a two-phase excitation pulse from 4000 to 20000 Hz.

In the present illustrative embodiment, a facing positional relation between the stator small teeth 42 and the rotor small teeth 32 is focused on. That is, a structure for generating a maximum torque is found as follows.

A magnetic flux $\Phi$ and an inductance L of a motor magnetic circuit satisfy the following (Equation 1) relation.

$$\Phi = L \times I \quad \text{(Equation 1)}$$

$\Phi$: magnetic flux L: inductance I: electric current

The inductance L of the motor magnetic circuit satisfies the following (Equation 2) relation.

$$L = \frac{\mu \cdot N^2 \cdot S}{l} \quad \text{(Equation 2)}$$

L: inductance of the motor magnetic circuit
$\mu$: magnetic permeability
N: the number of turns
S: a cross-sectional area of the magnetic circuit
l: a length of the magnetic circuit.

As can be seen from Equations 1 and 2, if it is intended to increase the magnetic flux $\Phi$, the inductance L needs to be increased. When the number of turns N and the electric current I are constant, the cross-sectional area S of the magnetic circuit needs to be increased to increase the inductance L. If the stator tooth thickness Ws of the stator small teeth 42 and the rotor tooth thickness Wr of the rotor small teeth 32 are increased, the cross-sectional area S of the magnetic circuit can be increased. However, when such dimensions are excessively increased, an influence of repulsion poles is also increased, and thus there is a problem to reduce the torque of the stepping motor 10.

In order to maximize the torque of the stepping motor 10, it is important that the facing area (effective facing area) which is a difference between an area of attraction poles of the stator small teeth 42 and the rotor small teeth 32 (the total area of repulsion pole surfaces) and an area of repulsion poles thereof (the total area of attraction pole surfaces) should be maximized. According to the illustrative embodiment, in a parameter space of a dimension ratio of the stator small teeth 42 and the rotor small teeth 32, the facing area is maximized, so that a torque characteristic at a low speed is maximized. Alternatively, the facing area is designed to range between a maximum value and 92% (a threshold value) of the maximum value in the parameter space. In particular, the stepping motor according to the present illustrative embodiment is obtained in a dimensional relation described in following FIGS. 5 to 8.

Figure 5A:
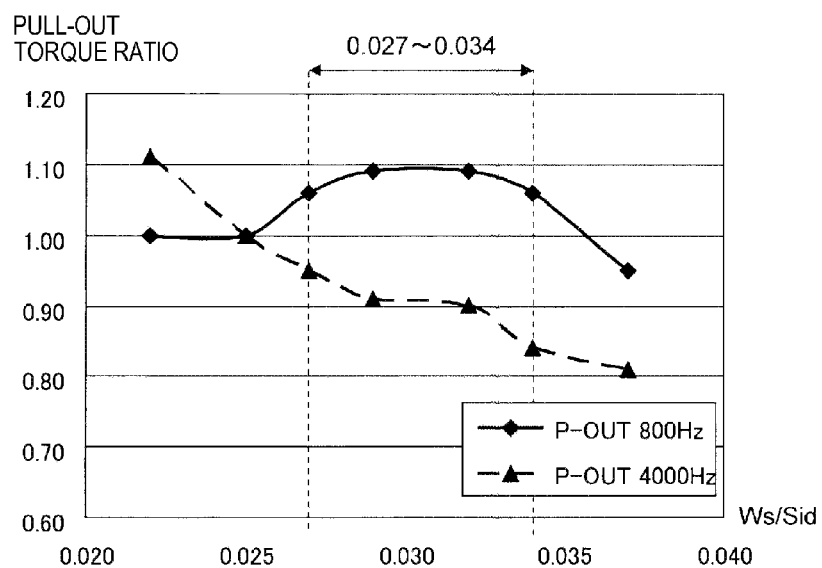
FIGS. 5A and 5B are graphs showing relations between a stator tooth thickness/a stator inner diameter and respective characteristics according to the illustrative embodiment.
Figure 5B:
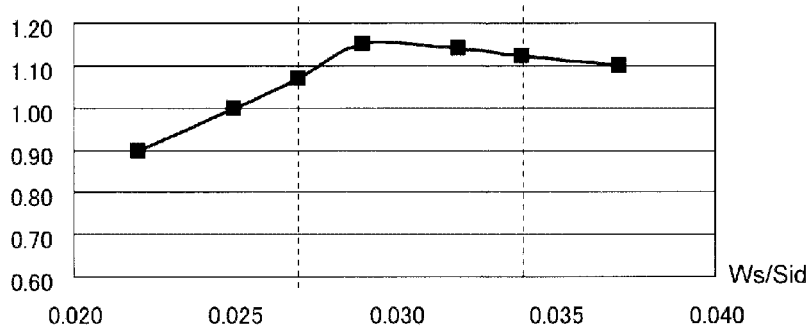

FIGS. 5A and 5B are graphs showing relations between the stator tooth thickness/the stator inner diameter and respective characteristics according to the illustrative embodiment.

FIG. 5A is a graph showing a relation between the stator tooth thickness Ws/the stator inner diameter Sid and a pull-out torque characteristic.

A vertical axis of FIG. 5A shows a relative torque of the 1.8 degrees step (200 steps) hybrid stepping motor 10. In the vertical axis of FIG. 5A, a value is taken as 1.0 when Ws/Sid=0.025. A horizontal axis of FIG. 5A shows a ratio of the stator tooth thickness Ws to the stator inner diameter Sid.

Diamond markers in FIG. 5A are examples at a low speed and show a torque characteristic of the stepping motor 10 when two-phase excitation pulse is 800 Hz. In this case, for the 1.8 degrees step stepping motor 10, since 1 revolution=200 pulses, the revolution speed is 4 revolutions/second=240 revolutions/minute=240 rpm.

Triangle markers in FIG. 5A are examples at a high speed and show a torque characteristic of the stepping motor 10 when two-phase excitation pulse is 4000 Hz. In this case, for the 1.8 degrees step stepping motor 10, since 1 revolution=200 pulses, the revolution speed is 20 revolutions/second=1200 revolutions/minute=1200 rpm.

When Ws/Sid=0.029, the torque of the stepping motor 10 at a low speed is maximized. If Ws/Sid ranges from 0.027 to 0.034, the torque of the stepping motor 10 at a low speed becomes preferable values, and the torque of the stepping motor 10 at a high speed is not significantly reduced compared to the existing structure.

FIG. 5B is a graph showing a relation between the stator tooth thickness Ws/the stator inner diameter Sid and the facing area. In this graph, a facing area ratio is taken as 1.0 when Ws/Sid=0.025.

When Ws/Sid=0.029, the facing area ratio is maximized. Accordingly, in the stator 40 of the 1.8 degrees step (200 steps) stepping motor 10 according to the illustrative embodiment, a relation between the stator tooth thickness Ws of the stator small teeth 42 and the stator inner diameter Sid, i.e., Ws/Sid is set to 0.029. However, Ws/Sid is not limited to this but may range from 0.027 to 0.034.

Figure 6A:
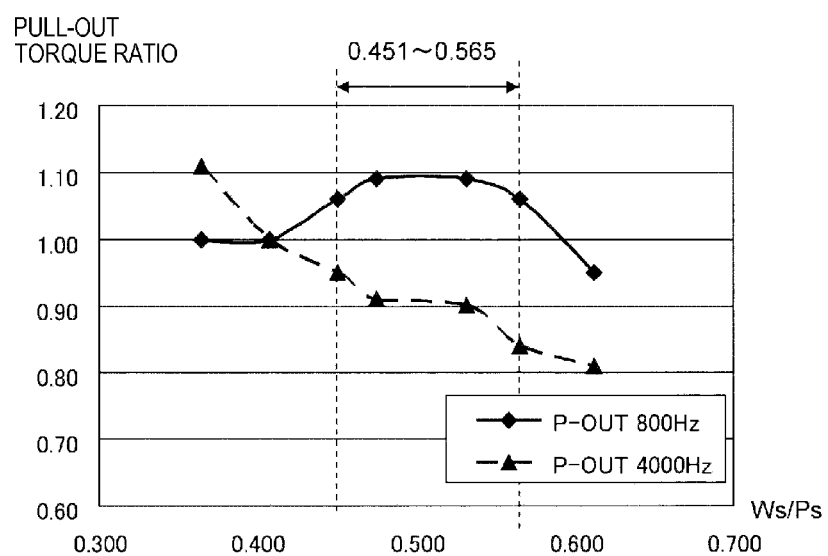
Figure 6A:
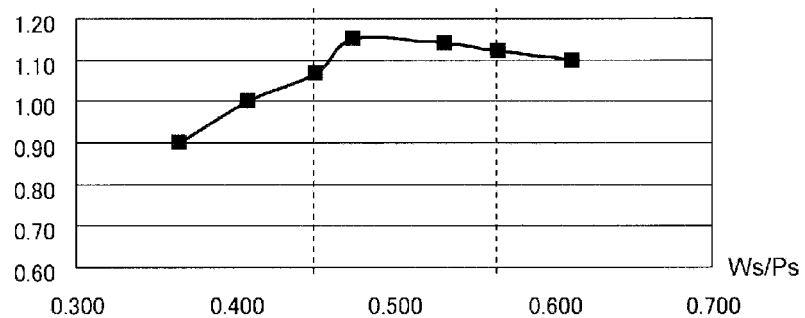

FIGS. 6A and 6B are graphs showing relations between the stator tooth thickness/the stator tooth pitch and respective characteristics according to the illustrative embodiment.

FIG. 6A is a graph showing a relation between the stator tooth thickness Ws/the stator tooth pitch Ps and a pull-out torque characteristic.

A vertical axis of FIG. 6A shows a relative torque of the 1.8 degrees step (200 steps) hybrid stepping motor 10. In the vertical axis of FIG. 6A, a value is taken as 1.0 when Ws/Ps=0.408. A horizontal axis of FIG. 6A shows a ratio of the stator tooth thickness Ws to the stator tooth pitch Ps.

Diamond markers in FIG. 6A show a torque characteristic (at a low speed) of the stepping motor 10 when two-phase excitation pulse is 800 Hz. Triangle markers in FIG. 6A show a torque characteristic (at a high speed) of the stepping motor 10 when two-phase excitation pulse is 4000 Hz.

When Ws/Ps=0.475, the torque of the stepping motor 10 at a low speed is maximized. If Ws/Ps ranges from 0.451 to 0.565, the torque of the stepping motor 10 at a low speed becomes preferable values, and the torque of the stepping motor 10 at a high speed is not significantly reduced compared to the existing structure.

FIG. 6B is a graph showing a relation between the stator tooth thickness Ws/the stator tooth pitch Ps and the facing area. In this graph the facing area ratio is taken as 1.0 when Ws/Ps=0.408.

When Ws/Ps=0.475, the facing area ratio is maximized. Accordingly, in the stator 40 of the 1.8 degrees step (200 steps) stepping motor 10 according to the illustrative embodiment, a relation between the stator tooth thickness Ws of the stator small teeth 42 and the stator tooth pitch Ps, i.e., Ws/Ps is set to 0.475. However, Ws/Ps is not limited to this but may range from 0.451 to 0.565.

Figure 7A:
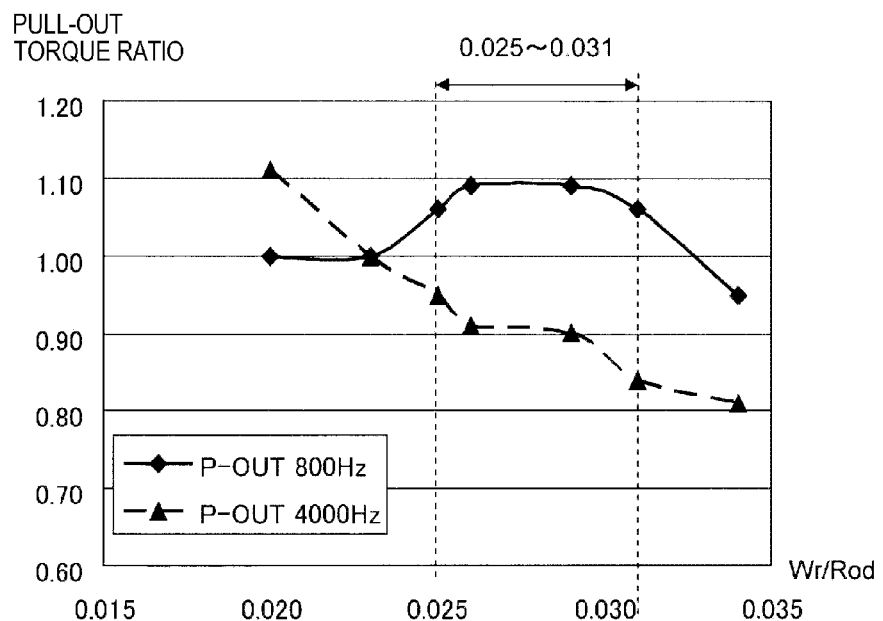
FIGS. 7A and 7B are graphs showing relations between a rotor tooth thickness/a rotor outer diameter and respective characteristics according to the illustrative embodiment.
Figure 7B:
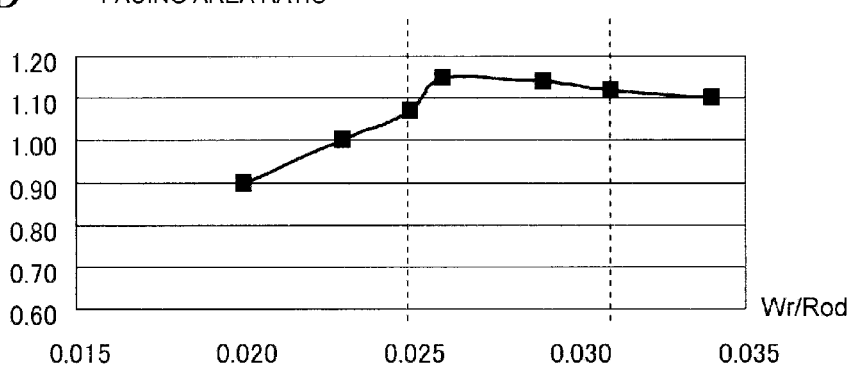

FIGS. 7A and 7B are graphs showing relations between the rotor tooth thickness/the rotor outer diameter and respective characteristics according to the illustrative embodiment.

FIG. 7A is a graph showing a relation between the rotor tooth thickness Wr/the rotor outer diameter Rod and a pull-out torque characteristic.

A vertical axis of FIG. 7A shows a relative torque of the 1.8 degrees step (200 steps) hybrid stepping motor 10. In the vertical axis of FIG. 7A, a value is taken as 1.0 when Wr/Rod=0.023. A horizontal axis of FIG. 7A shows a ratio of the rotor tooth thickness Wr to the rotor outer diameter Rod.

Diamond markers in FIG. 7A show a torque characteristic (at a low speed) of the stepping motor 10 when two-phase excitation pulse is 800 Hz. Triangle markers in FIG. 7A show a torque characteristic (at a high speed) of the stepping motor 10 when two-phase excitation pulse is 4000 Hz.

When Wr/Rod=0.026, the torque of the stepping motor 10 at a low speed is maximized. If Wr/Rod ranges from 0.025 to 0.031, the torque of the stepping motor 10 at a low speed becomes preferable values, and the torque of the stepping motor 10 at a high speed is not significantly reduced compared to the existing structure.

FIG. 7B is a graph showing a relation between the rotor tooth thickness Wr/the rotor outer diameter Rod and the opposing area ratio. In this graph, the facing area ratio is taken as 1.0 when Wr/Rod=0.023.

When Wr/Rod=0.026, the facing area ratio is maximized. Accordingly, in the rotor 30 of the 1.8 degrees step (200 steps) stepping motor 10 according to the illustrative embodiment, a relation between the stator tooth thickness Wr of the rotor small teeth 32 and the rotor outer diameter Rod, i.e., Wr/Rod is set to 0.026. However, Wr/Rod is not limited to this but may range from 0.025 to 0.031.

Figure 8A:
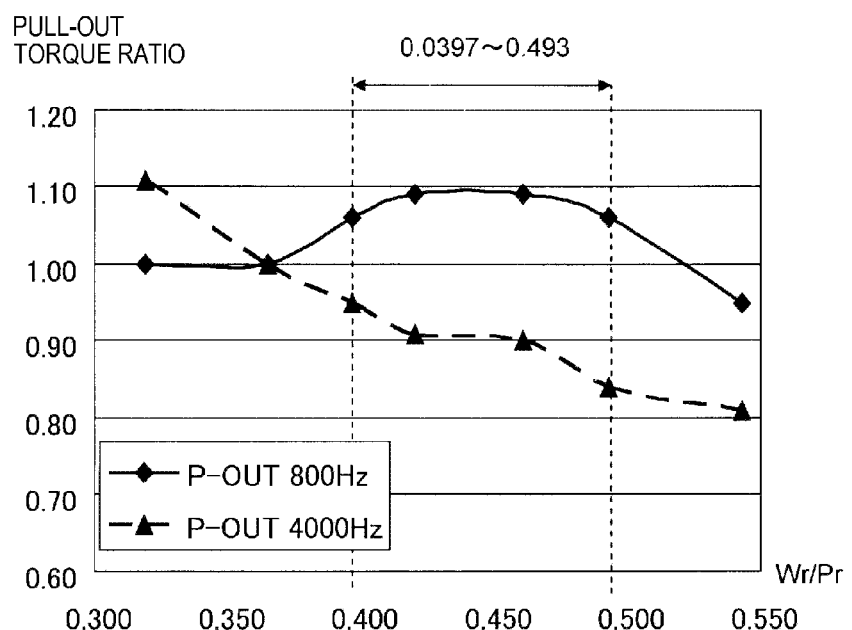
FIGS. 8A and 8B are graphs showing relations between the rotor tooth thickness/a rotor tooth pitch and respective characteristics according to the illustrative embodiment.
Figure 8B:
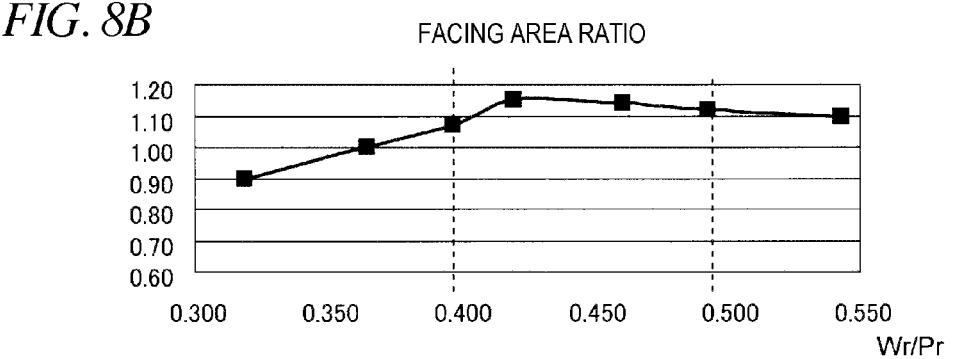

FIGS. 8A and 8B are graphs showing relations between the rotor tooth thickness/the rotor tooth pitch and respective characteristics according to the illustrative embodiment.

FIG. 8A is a graph showing a relation between the rotor tooth thickness Wr/the rotor tooth pitch Pr and a pull-out torque characteristic.

A vertical axis of FIG. 8A shows a relative torque of the 1.8 degrees step (200 steps) hybrid stepping motor 10. In the vertical axis of FIG. 8A, a value is taken as 1.0 when Wr/Pr=0.365. A horizontal axis of FIG. 8A shows a ratio of the rotor tooth thickness Wr to the rotor tooth pitch Pr.

Diamond markers in FIG. 8A show a torque characteristic (at a low speed) of the stepping motor 10 when two-phase excitation pulse is 800 Hz. Triangle markers in FIG. 8A show a torque characteristic (at a high speed) of the stepping motor 10 when two-phase excitation pulse is 4000 Hz.

When Wr/Pr=0.420, the torque of the stepping motor 10 at a low speed is maximized. If Wr/Pr ranges from 0.397 to 0.493, the torque of the stepping motor 10 at a low speed becomes preferable values, and the torque of the stepping motor 10 at a high speed is not significantly reduced compared to the existing structure.

FIG. 8B is a graph showing a relation between the rotor tooth thickness Wr/the rotor tooth pitch Pr and the facing area. In this graph, the facing area ratio is taken as 1.0 when Wr/Pr=0.408.

When Wr/Pr=0.420, the facing area ratio is maximized. Accordingly, in the rotor 30 of the 1.8 degrees step (200 steps) stepping motor 10 according to the illustrative embodiment, a relation between the stator tooth thickness Wr of the rotor small teeth 32 and the rotor tooth pitch Pr, i.e., Wr/Pr is set to 0.420. However, Wr/Pr is not limited to this but may be range from 0.397 to 0.493.

In the 1.8 degrees step (200 steps) hybrid stepping motor 10 according to the illustrative embodiment, a relation between the stator pole thickness Wp (see FIG. 3A) and the stator outer diameter Sod is Wp/Sod=0.085, and a relation between the stator pole thickness Wp and the stator inner diameter Sid is Wp/Sid=0.137.

Effects of the Present Illustrative Embodiment

In the foregoing illustrative embodiment, the following effects (A) to (C) may be obtained.

(A) The torque at a low speed driven at 0 to 1500 Hz is increased by approximately 1.2 times greater than that of the existing structure, while the torque at a high speed driven at 4000 to 20000 Hz is not significantly reduced compared to the existing structure.

(B) By changing the rotor outer diameter Rod to be 1.06 times greater than that of the related art, the torque is improved by 1.06 times. Also, the torque is increased by 1.09 times by changing dimensions of the rotor small teeth 32 and the stator small teeth 42. Due to a synergy effect obtained by changing the rotor outer diameter Rod and dimensions of the rotor small teeth 32 and the stator small teeth 42, the torque is increased by approximately 1.2 times greater than that of the existing structure.

(C) The torque at a high speed is reduced from 95% to 84% in the graphs. However, the torque is increased by 6% due to changing of the rotor diameter, and thus the range corresponds to 101% to 90%, as compared in the absolute value of the torque of the existing structure. Therefore, the torque at a high speed is not significantly reduced compared to the existing structure.

Modifications

While the present invention has been shown and described with reference to certain illustrative embodiments thereof, it will be understood by those skilled in the art that various changes in form and details may be made therein without departing from the spirit and scope of the invention as defined by the appended claims. For example, the following modification (a) to (c) may be employed.

(a) The present illustrative embodiment is directed to a 1.8 degrees step (200 steps) hybrid stepping motor 10. However, the stepping motor is not limited to this but may be a hybrid stepping motor having other step angles.

In this case, the ratio of the stator tooth thickness Ws to the stator tooth pitch Ps (Ws/Ps) and the like, for example, defining the stator tooth pitch Ps and the rotor tooth pitch Pr can be applied as it is (e.g., 0.451 to 0.565). However, the ratio of the stator tooth thickness Ws to the stator inner diameter Sid (Ws/Sid) and the like, for example, defining the stator inner diameter Sid and the rotor outer diameter Rod can be applied by changing it to correspond to a step angle.

Specifically explaining modifications corresponding to the step angle, since the preferable ratio of the stator tooth thickness Ws to the stator inner diameter Sid applied to the 1.8 degrees step ranges from 0.027 to 0.034, the ratio may be applied in a range from 0.054 to 0.068 corresponding to two times when applied to 3.6 degrees step (i.e., double coarseness). Also, when applied to 0.9 degrees step (i.e., ½ fineness), the ratio may be applied in a range from 0.0135 to 0.017 corresponding to ½ times.

(b) The present invention is not limited to the two-phase stepping motor 10, but may be applied to, for example, a three or five-phase stepping motor.

(c) The present invention is not limited to the stator outer diameter of 56.4 mm, but may be applied to a stepping motor having a stator outer diameter of, for example, 42 mm.

What is claimed is:

1. A hybrid stepping motor comprising:
    a rotor including a plurality of rotor teeth arranged at an equal pitch on an outer circumferential surface thereof; and
    a stator including a plurality of salient poles, each including a plurality of stator teeth of stator salient pole arranged to face the outer circumferential surface of the rotor via a gap,
    wherein the stator teeth of stator salient pole have a predetermined stator tooth thickness and are arranged at a predetermined stator tooth pitch,
    wherein the rotor teeth have a predetermined rotor tooth thickness and are arranged at a predetermined rotor tooth pitch, and
    wherein a facing area being a difference between an area of attraction poles of the stator teeth and the rotor teeth and an area of repulsion poles thereof ranges from a maximum value and a threshold value of the maximum value, and
    wherein the ratio of the stator tooth thickness to the stator inner diameter ranges from 0.027 to 0.034, and wherein the ratio of the rotor tooth thickness to the rotor outer diameter ranges from 0.025 to 0.031.

2. The hybrid stepping motor according to claim 1, wherein the ratio of the stator tooth thickness to the stator tooth pitch ranges from 0.451 to 0.565, and wherein the ratio of the rotor tooth thickness to the rotor tooth pitch ranges from 0.397 to 0.493.

3. The hybrid stepping motor according to claim 1, wherein a tooth bottom shape of the stator teeth of stator salient pole and the rotor teeth is a reversed trapezoid.

4. A hybrid stepping motor comprising:
    a rotor including a plurality of rotor teeth arranged at an equal pitch on an outer circumferential surface thereof; and
    a stator including a plurality of salient poles, each including a plurality of stator teeth of stator salient pole arranged to face an outer circumferential surface of the rotor via a gap, wherein the stator teeth of stator salient pole have a ratio of a stator tooth thickness to a stator inner diameter in a range from 0.027 to 0.034, and wherein the rotor teeth have a ratio of a rotor tooth thickness to a rotor outer diameter in a range of 0.025 to 0.031.

* * * * *